United States Patent [19]
Robinson et al.

[11] Patent Number: 5,761,026
[45] Date of Patent: Jun. 2, 1998

[54] SNAP-ON CIRCUIT BREAKER MOUNTING SYSTEM

[75] Inventors: Ronald Lee Robinson, Murfreesboro, Tenn.; Jerry Lynn Scheel; Dale Wayne Bennett, both of Cedar Rapids, Iowa

[73] Assignee: Square D Company, Palatine, Ill.

[21] Appl. No.: 627,743

[22] Filed: Apr. 2, 1996

[51] Int. Cl.$^6$ .................................................. H02B 1/01
[52] U.S. Cl. .......................... 361/627; 200/303; 361/634; 361/637; 361/673
[58] Field of Search ............... 174/149 B; 200/293–296, 200/303; 361/611, 624, 627–628, 631, 634–636, 640, 643–644, 647–648, 652, 656, 658, 673, 837; 439/716

[56] References Cited

U.S. PATENT DOCUMENTS

| | | | |
|---|---|---|---|
| 3,403,299 | 9/1968 | Mrowka et al. | 361/634 |
| 4,609,898 | 9/1986 | Seymour et al. | 200/293 |
| 4,623,859 | 11/1986 | Erickson et al. | 335/14 |
| 4,667,268 | 5/1987 | Mrowka | 361/673 |
| 4,794,356 | 12/1988 | Yu et al. | 335/13 |
| 4,796,844 | 1/1989 | Barker | 248/222.2 |
| 4,831,221 | 5/1989 | Yu et al. | 200/553 |
| 4,864,263 | 9/1989 | Castonguay et al. | 335/167 |
| 4,905,122 | 2/1990 | Culnan et al. | 361/673 |
| 4,912,439 | 3/1990 | Nagy et al. | 335/132 |
| 5,003,139 | 3/1991 | Edds et al. | 200/401 |
| 5,046,173 | 9/1991 | Wall, Jr. | 361/673 |
| 5,083,103 | 1/1992 | Winter et al. | 355/14 |
| 5,140,115 | 8/1992 | Morris et al. | 200/308 |
| 5,172,088 | 12/1992 | Morgan | 335/201 |
| 5,180,051 | 1/1993 | Cook et al. | 200/400 |
| 5,252,937 | 10/1993 | Bernier et al. | 335/202 |
| 5,272,591 | 12/1993 | Blue et al. | 361/622 |
| 5,272,592 | 12/1993 | Harris et al. | 361/637 |
| 5,301,083 | 4/1994 | Grass et al. | 361/64 |
| 5,404,266 | 4/1995 | Orchard et al. | 361/667 |
| 5,418,683 | 5/1995 | Orchard et al. | 361/672 |
| 5,430,419 | 7/1995 | Scheel et al. | 335/16 |

*Primary Examiner*—Gregory D. Thompson
*Attorney, Agent, or Firm*—Larry I. Golden; Kareem M. Irfan

[57] ABSTRACT

The present invention provides a mounting system for circuit breakers in an electrical panelboard assembly. The base and cover forming the circuit breaker casing has an integral foot extending from a bottom side. The foot is angled and has a notch on a side forming an acute angle with the bottom. The panelboard assembly has a bus cover adapted with a opening or opening to receive the foot. This secures the circuit breaker on one end, and a screw into a bus secures the circuit breaker on an opposing end. The bus cover has a rail which engages the notch in the foot. On an opposing side of the foot, a spring engages the foot and forces the foot into the rail. The spring is an integral part of the bus cover and is cantilevered at an angle to the main body of the bus cover. Ledges are formed integrally into the bus cover on opposing sides of the spring. The ledges prevent overstressing the spring while inserting the foot during installation of the circuit breaker.

18 Claims, 7 Drawing Sheets

5,761,026

1
SNAP-ON CIRCUIT BREAKER MOUNTING SYSTEM

BACKGROUND OF THE INVENTION

1. Field of the Invention

This invention relates generally to electric circuit breakers and more particularly to the mounting of circuit breakers onto circuit breaker panelboards.

2. Description of the Related Art

Panelboards, switchboards, and electrical distribution devices are commonly used in residential, commercial, and industrial buildings, as well as for commercial and industrial equipment. Individual circuit interrupters, circuit breakers or fuses, are mounted to these devices to protect branch circuits against overloads and fault conditions. Basically, circuit interrupters like circuit breakers and fusible switches comprise a pair of separable contacts, a spring-operated mechanism for effecting separation of the contacts, and a tripping mechanism or fuse which automatically releases the operating mechanism upon the occurrence of an overload or fault condition.

Panelboards and the like are often constructed with bus bars or projecting lugs to form disconnect contacts for the installation and removal of individual circuit interrupters. These bus bars and lugs are rigidly attached to the upper surface of the panelboard support molding, and are covered by bus covers. U.S. Pat. Nos. 5,272,591 and 5,272,592 describe such assemblies and are both incorporated herein by reference in their entirety.

Circuit breakers, rather than fuses, are now commonly used for temporary interruption of electrical power to electrical devices (loads). Various circuit breaker mechanisms have evolved and have been perfected over time on the basis of application-specific factors such as current capacity, response time, and the type of reset (manual or remote) function desired of the breaker.

One type of circuit breaker mechanism employs a thermomagnetic tripping device to trip a latch in response to a specific range of over-current conditions. In another type of circuit breaker, referred to as a double-break circuit breaker, two sets of current breaking contacts are included to accommodate a higher level of over-current conditions than can be handled by one set of contacts. U.S. Pat. No. 5,430,419 describes a typical mechanical and electrical assembly that is utilized in circuit breakers according to the present invention and is incorporated herein by reference in its entirety.

In general, the present invention pertains to the mounting of circuit breakers on an assembly to form a panelboard. A panelboard may accept a multiple phase source of electricity and provide that electricity on a number of busses equal to the number of phases. Circuit breakers are connected by some means to the busses so as to place the circuit breaker in an electrical circuit between a load and the bus with the bus providing the source of electricity. Circuit breakers are also typically secured to the panelboard at a nonelectrical connection.

Although existing panelboard assemblies adequately secure the circuit breakers to the panelboard, the circuit breakers are not entirely immobilized prior to connection of load wires. When such a panelboard has premounted circuit breakers, the assembly tends to rattle during transport and handling, creating a perception of poor quality. Thus, it is desirable that the circuit breakers fit sufficiently tightly in the panelboard so as to be immobilized.

2
SUMMARY OF THE INVENTION

The present invention provides a panelboard assembly, comprising:

(a) a bus for providing a source of electricity; (b) a circuit breaker connected to the bus for interrupting power in a circuit path between the source and a load; and (c) a bus cover for covering the bus. The circuit breaker comprises:

(a) an electromechanical assembly including first and second contacts cooperatively arranged in the circuit path for providing current from the source to the load, wherein at least one of the contacts is movable for interrupting the power provided to the load; (b) a base adapted to receive the electromechanical assembly and having a bottom side; (c) a cover adapted to cover the electromechanical assembly and mate with the base, the cover having a bottom side; and (d) a foot formed integral with the base and cover extending from the bottom side. The bus cover is adapted to receive the foot and engage the circuit breaker.

In a preferred embodiment the foot extends from the base and cover at an angle to the bottom side. Preferably, the foot has first and second sides, where the first side forms an acute angle with the bottom side, and the second side forms an obtuse angle with the bottom side. The foot may have a notch in the first side adjacent the bottom side. The bus cover may have an opening or recess for receiving the foot, and, preferably, a spring projects over the opening for engaging the foot. A rail may be provided adjacent the opening for engaging the foot. Ledges may be provided adjacent the opening for preventing overstressing the spring. The ledges may serve as stops for the foot during assembly so that the spring is not damaged.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENT

Figure 1:
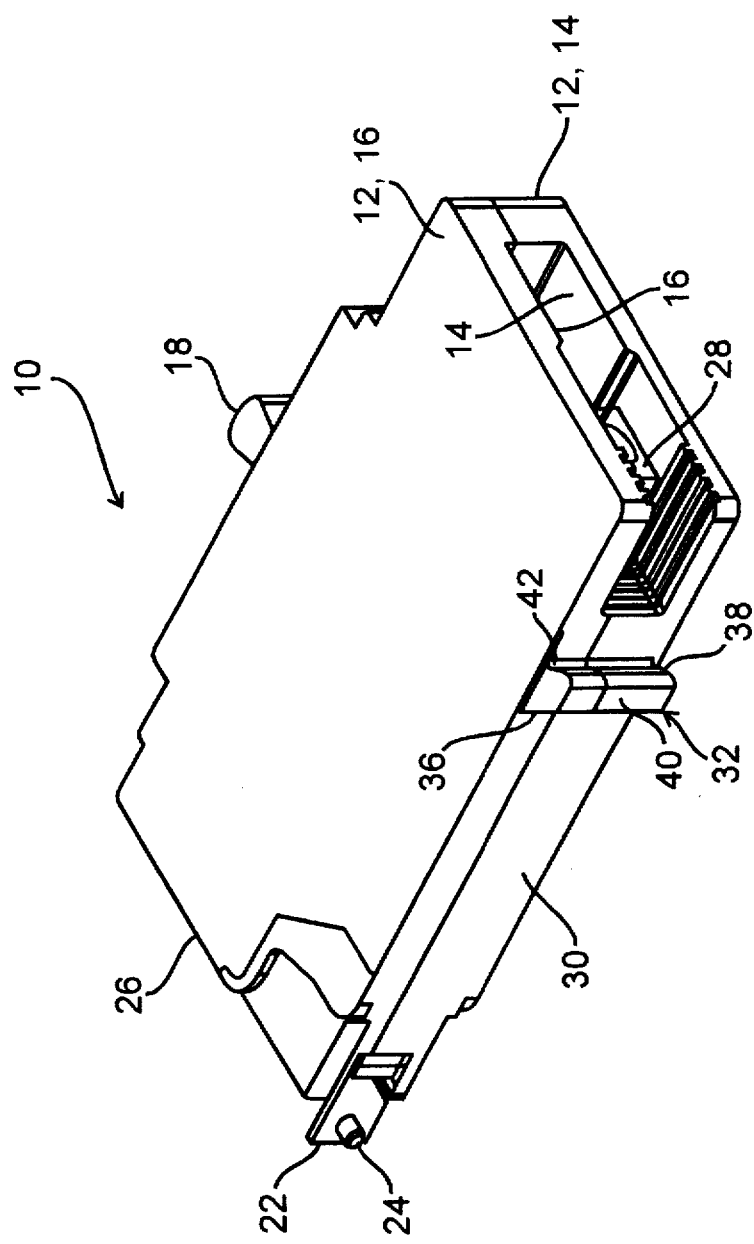
FIG. 1 shows an isometric view of a circuit breaker according to the present invention.
Figure 2:
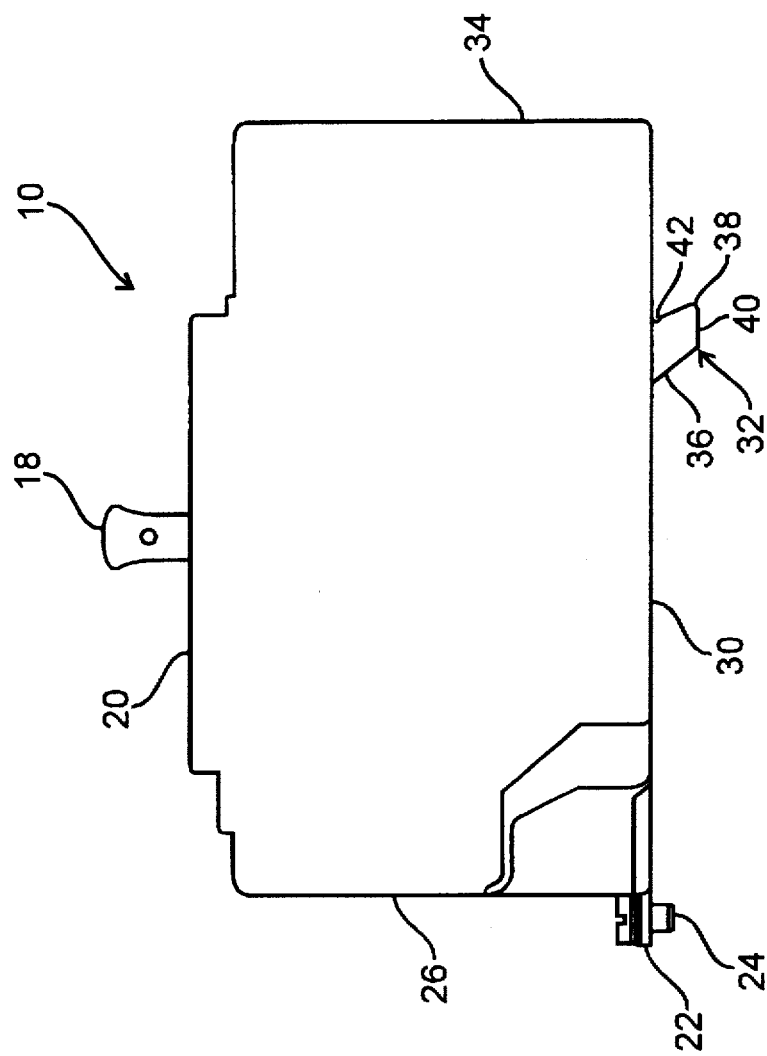
FIG. 2 shows an elevation of the circuit breaker of FIG. 1.

With reference to the drawings where like elements are labeled with like numbers, FIG. 1 and FIG. 2 show a circuit breaker 10. The circuit breaker 10 is shown in an isometric view in FIG. 1 and in an elevation in FIG. 2. As best seen in FIG. 1, the circuit breaker 10 is a generally rectangularly shaped box having broad and narrow sides. The housing or casing 12 of the circuit breaker 10 has two main parts: a base 14 and a cover 16, which are held together by rivets (not shown). The mechanical and electrical assembly that provides the functionality of the circuit breaker 10 is enclosed within the housing or casing 12 between the base 14 and the cover 16. The present invention is not concerned with the internal mechanical and electrical assembly because it is not limited to any particular configuration or operational aspects of the assembly within the circuit breaker 10.

The switch handle 18 protrudes through the top side 20 of the casing 12. An electrical connector 22, typically having a screw 24, protrudes through an end 26. The electrical connector 22 is connected to a bus (not shown) in a panelboard (not shown) for providing a source of electricity to a load connected to a lug 28. The electrical connector 22 protrudes adjacent a bottom side 30. The casing 12 is a molded, nonconductive material (typically, but not necessarily, a thermoset material), and the bottom side 30, has an extension or foot 32 near an opposing end 34. The foot 32 is located at roughly one quarter of the distance between the end 34 and the end 26 and is closer to the end 34. The foot 32 is an integral part of the casing 12 and is molded as a protrusion from the base 14 and from the cover 16.

As best seen in FIG. 1, the foot 32 is not quite as wide as the casing 12, a detail that will be discussed further below. As best seen in FIG. 2, the foot 32 has a first surface 36 and a second surface 38 which lie in planes running at an angle to the bottom side 30 toward the end 34. A third surface 40 is formed by the bottom of the foot 32. The foot 32 has a notch 42 which forms a C-shaped indent in the second surface 38 adjacent the bottom side 30. The significance of the notch 42 will be discussed below.

Figure 3:
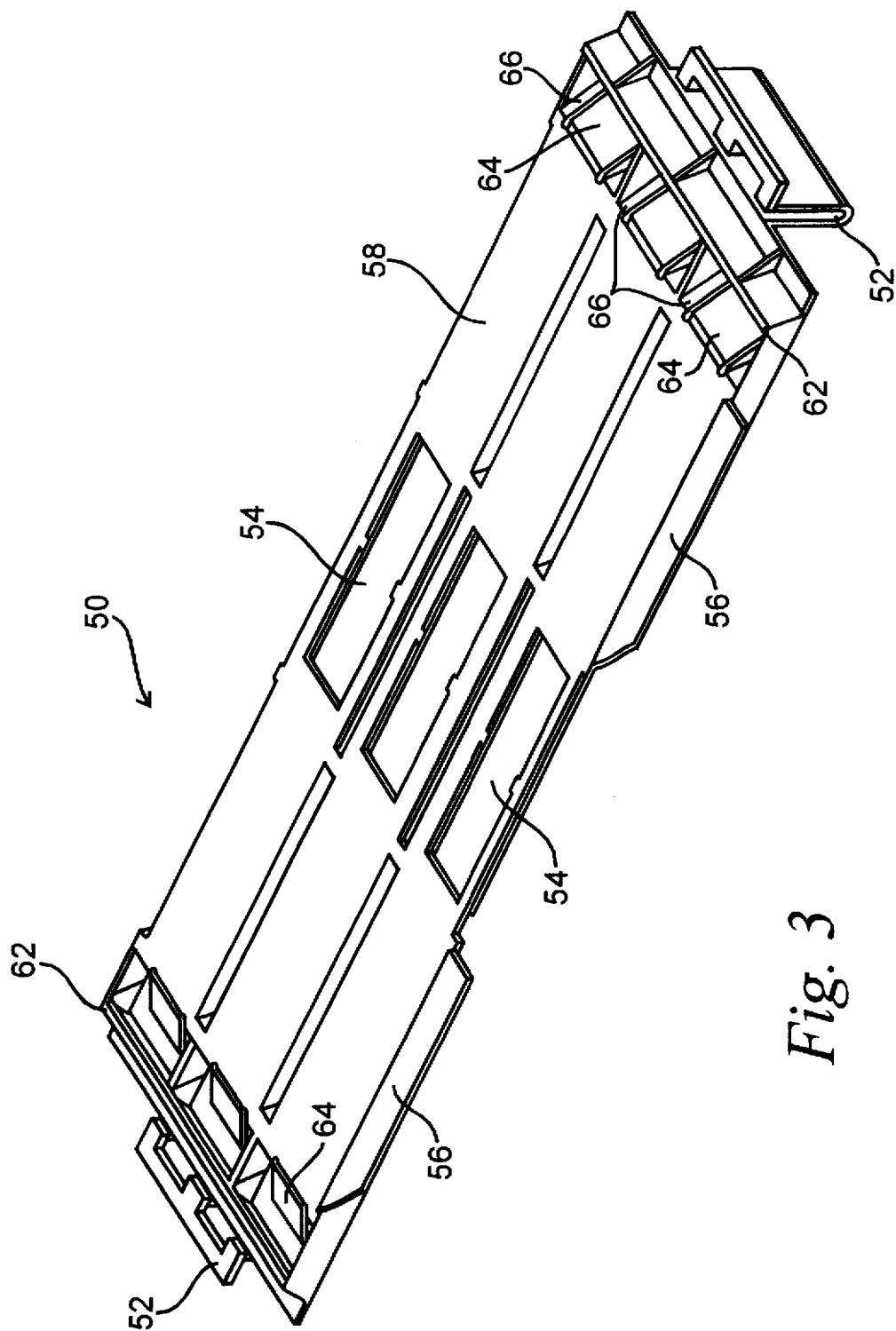
FIG. 3 shows an isometric view of a bus cover according to the present invention.
Figure 4:
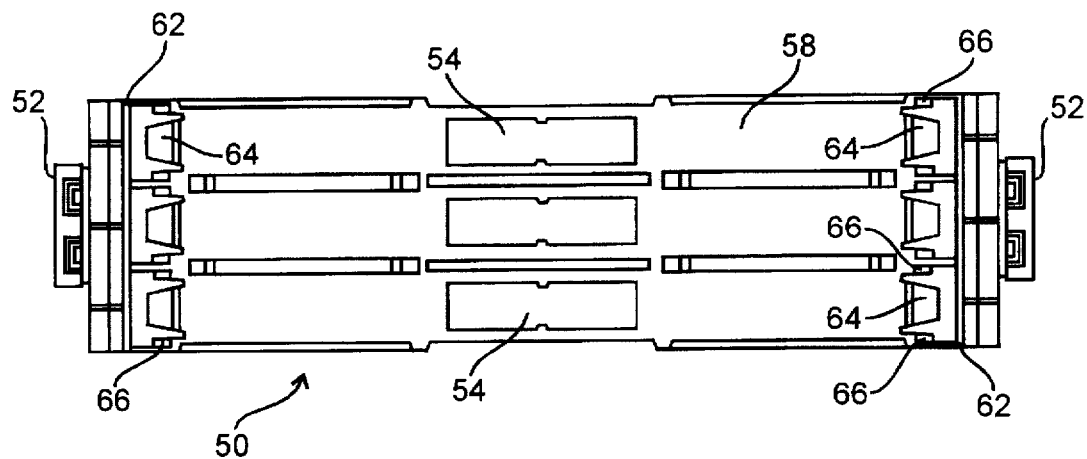
FIG. 4 shows a plan view of the bus cover of FIG. 3.
Figure 5:
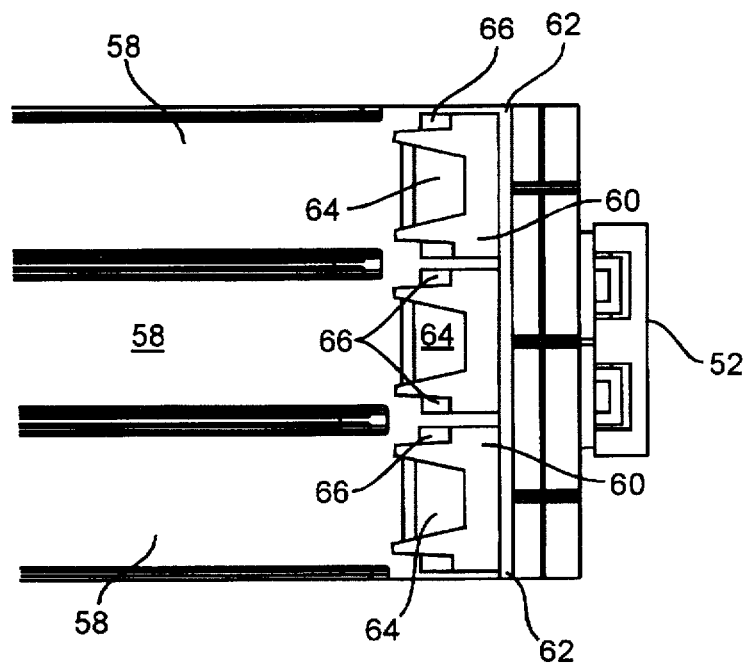
FIG. 5 shows an enlarged plan view of one end of the bus cover of FIG. 4.

Turning now to the panelboard that contains the busses, which supply the source electricity. FIGS. 3–5 illustrate a bus cover 50 which covers the energized busses and reduces the risk of an electrical shock. FIG. 3 shows an isometric illustration, and FIG. 4 provides a plan view of a bus cover 50. FIG. 5 is an enlarged plan view of one end of a bus cover 50. The bus cover 50 has locking tabs 52 which snap into elements within a panelboard (not shown) to secure the bus cover 50 over the busses. The bus cover 50 has openings 54 in its center which provide access to underlying busses (not shown). The bus cover 50 has sides 56 and a top 58 and is a single, nonconducting molded piece, which is typically, but not necessarily, made of a thermoplastic.

The bus cover 50 has recesses, holes or openings 60 which are adapted to receive the foot 32 of the circuit breaker 10. Adjacent to the openings 60, the bus cover 50 has rails 62. The rails 62 are sized and shaped to matingly receive the notch 42 in the foot 32. Thus, the C-shaped notch 42 engages around the rail 62. The rail 62 is an integral part of the bus cover 50 and is slightly raised above the surface of the top 58. This raised portion of the rail 62 is rounded to matingly receive the C-shaped notch 42. The side of the rail adjacent the opening 60 is likewise rounded to matingly receive the C-shaped notch 42.

As best seen in FIG. 5, the top 58 has an integral leaf spring 64 that extends over each opening 60. As best seen in FIG. 3, the leaf springs 64 are not flush with the surface of the top 58, but rather angle downward into the openings 60. Each leaf spring 64 is essentially identical and is cantilevered with the top 58 at a downward angle. Each spring 64 is free on three sides so that the spring 64 can bend downward further into the opening 60. The purpose of the spring 64 is to engage the surface 36 of the foot 32 and apply a force to the foot 32 to ensure a snug engagement between the notch 42 and the rail 62.

As best seen in FIG. 5, ledges 66 are provided to prevent overstressing the spring 64 when inserting the foot 32 into the opening 60 during installation. As mentioned earlier, the foot 32 is not quite as wide as the casing 12. The foot 32 is narrow enough to fit within the opening 60, but the foot 32 will not pass between a pair of ledges 66. The foot 32 will engage the spring 64, but if pushed further into the opening 60, the foot 32 will engage the ledges 66. Thus, the ledges 66 serve as a stop to prevent the circuit breaker 10 from being inserted into the opening 60 so far that the spring 64 is overstressed or otherwise damaged. As best seen in FIG. 3, the ledges 66 are angled downward so that after installation of the circuit breaker 10, the ledges 66 are roughly parallel with the surface 36 of the foot 32. After installation, the foot 32 rests on the spring 64, but not on the ledges 66, and the spring 64 is under a tension or compression that causes the spring 64 to force the notch 42 into a reasonably tight engagement with the rail 62.

Figure 6:
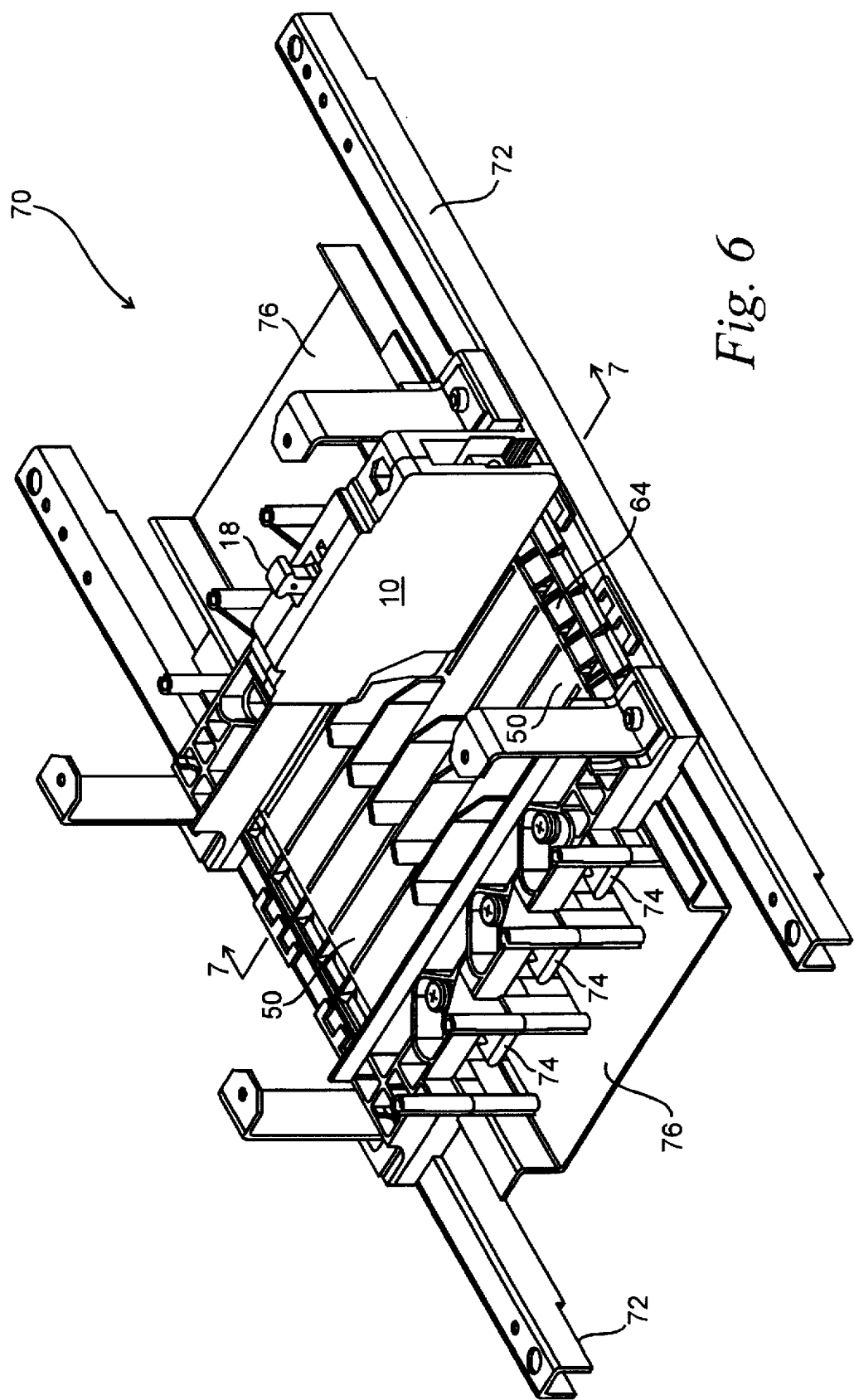
FIG. 6 shows an isometric illustration of a partially assembled panelboard.
Figure 7:
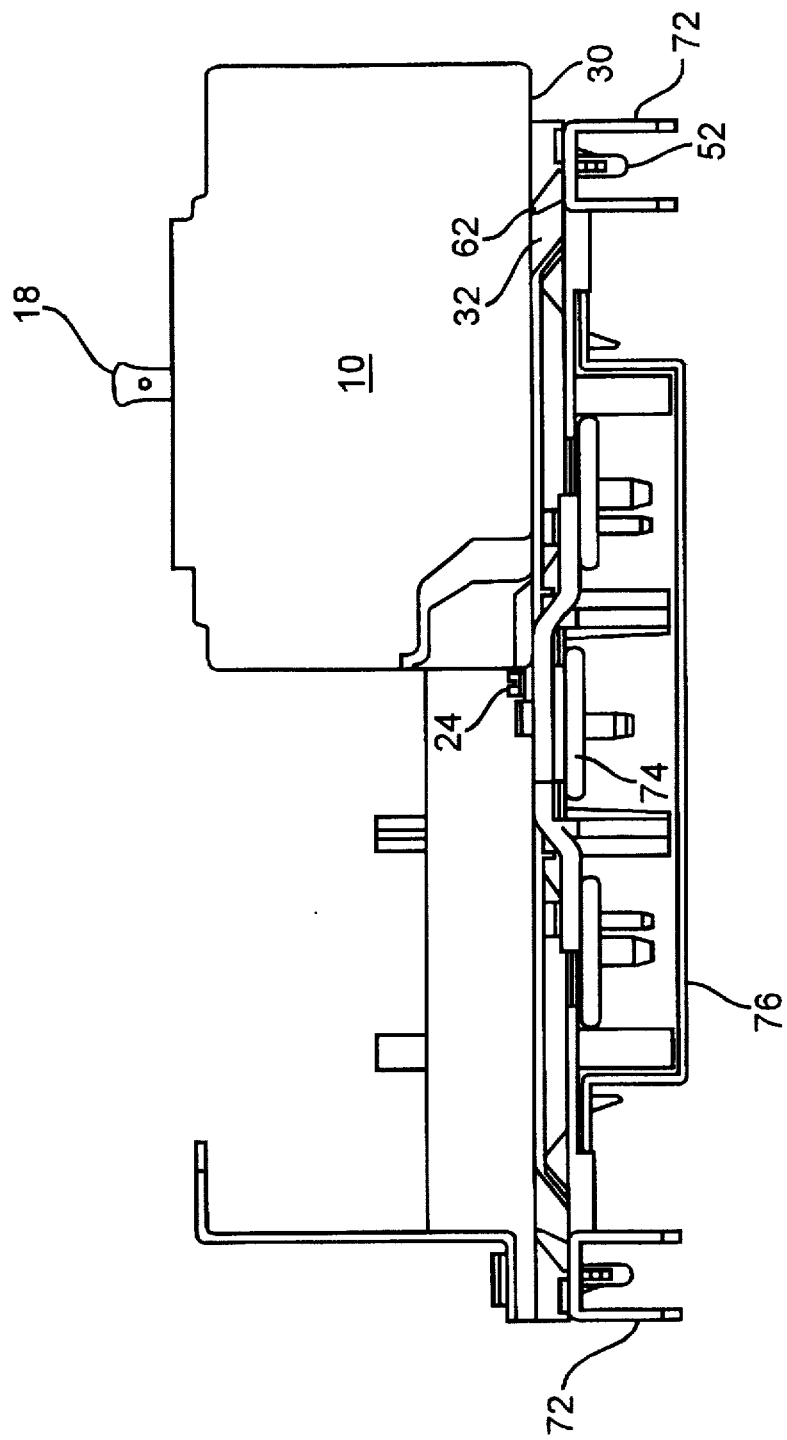
FIG. 7 shows a cross section of the panelboard of FIG. 6 as seen along the lines 7—7.
Figure 8:
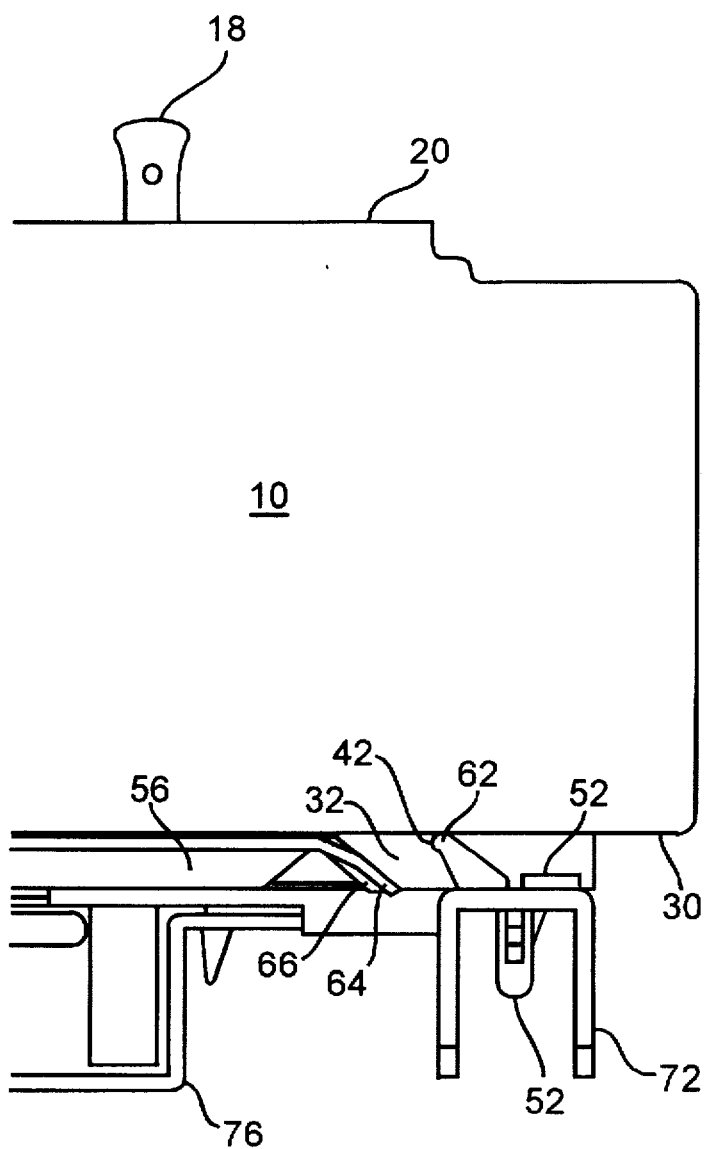
FIG. 8 shows an enlargement of a portion of the cross section shown in FIG. 7.

Turning now to the use of the present invention, FIG. 6 is an isometric illustration of a partially assembled panelboard 70. One single pole circuit breaker 10 is shown installed. Although a single pole circuit breaker has been used throughout for illustration purposes, the present invention is equally applicable for multiple pole circuit breakers. FIG. 7 is a cross section of the panelboard of FIG. 6 as seen along the lines 7—7. FIG. 8 is an enlargement of a portion of the cross section shown in FIG. 7, which illustrates the engagement of the foot 32 with the rail 62 and spring 64. The bus cover 50 is engaged, via the locking tabs 52, with mounting rails 72, which have slots (not shown) for receiving the locking tabs 52. Bus bars 74 are secured within the panelboard 70 and isolated from the enclosure (not shown) by insulator 76.

A circuit breaker 10 is installed by inserting the foot 32 into the opening 60 while the circuit breaker 10 is rotated away from the bus cover 50. The notch 42 engages with the rail 62.. With the notch 42 engaged with the rail 62, the circuit breaker 10 is rotated toward the bus cover 50 until the bottom 30 of the circuit breaker 10 contacts the top 58 of the bus cover 50. The screw 24 of connector 22 is then screwed into the bus bar 74, as shown in FIG. 7. The connection between connector 22 and bus bar 74 is tight because sufficient torque is applied to the screw 24 by an installer using a screwdriver.

As best seen in FIG. 8, the engagement of the foot 32 with the rail 62 and the spring 64 is also tight. The spring 64 forces the foot 32 to rest snugly against the rail 62. FIG. 8 further illustrates that the surface 38 of the foot 32 rests against a portion of the bus cover 50 which ends in the rail 62. The acute angle of the foot 32 and the contact between the surface 38 and the bus cover 50 holds this end of the breaker 10 in place. The bus cover 50 is securely engaged with the mounting rails 72. The circuit breaker 10 is secured at one end to the bus bar 74, which is secured within the panelboard 70. The opposing end of the circuit breaker 10 is secured to the bus cover 50 by engagement of the foot 32 with the rail 62. The foot 32 of the circuit breaker 10 is held snugly against the rail 42 by the spring 64.

With the present invention, the circuit breaker 10 and panelboard 70 assembly is free from any movement. Even in transport or handling, there is no movement, vibration or rattling of the various components. This tightness and freedom from movement not only improves the perception of quality, but also makes a panelboard assembled according to the present invention superior to one that is not. Further, this tightness enables the panelboard to better withstand the effects of vibration after installation.

In summary, the present invention provides a system for securely mounting a circuit breaker in a panelboard so that the assembly is virtually immobilized. Each circuit breaker has two rigid connections. One connection is near a first end and uses the foot, which is engaged with the rail and spring of the bus cover. The second connection is at a second end of the circuit breaker and comprises the electrical connection to the bus. With the present invention, circuit breakers may be installed at the factory or otherwise before field installation, and the assembled panelboard is rigidly secured.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A panelboard assembly, comprising:
   (a) a bus for providing a source of electric power;
   (b) a circuit breaker connected to the bus for interrupting the electric power in a circuit path between the source and a load, having:
      (i) an electromechanical assembly including first and second contacts cooperatively arranged in the circuit path for providing current from the source to the load, wherein at least one of the contacts is movable for interrupting the power provided to the load; and
      (ii) a casing enclosing the electromechanical assembly, said casing having a member extending from a side; and
   (c) a bus cover for covering the bus, the bus cover having an opening for receiving the extended member to engage the circuit breaker.

2. The panel board assembly of claim 1, wherein the extended member extends at an angle to the side.

3. The panelboard assembly of claim 1, wherein the bus cover has a spring projecting over the opening for engaging the extended member.

4. The panelboard assembly of claim 3, wherein the bus cover has a rail adjacent the opening for engaging the extended member.

5. The panelboard assembly of claim 4, wherein the bus cover has opposing ledges adjacent the opening for preventing overstressing the spring.

6. The panelboard assembly of claim 2, wherein the extended member has first and second sides, the first side forms an acute angle with the side of the casing, and the second side forms an obtuse angle with the side of the casing.

7. The panelboard assembly of claim 6, wherein the extended member has a notch in the first side adjacent the side of the casing.

8. The panelboard assembly of claim 7, wherein the bus cover has a rail adapted to receive the notch.

9. The panelboard assembly of claim 8, wherein the bus cover has a spring for engaging the second side of the extended member and pressing the extended member against the rail.

10. The panelboard assembly of claim 8, wherein the bus cover has a ledge adjacent the spring for stopping the extended member from overstressing the spring during installation of the circuit breaker.

11. A circuit breaker for interrupting power in a circuit path between a source and a load, comprising:
   (a) an electromechanical assembly including first and second contacts cooperatively arranged in the circuit path for providing current from the source to the load, wherein at least one of the contacts is movable for interrupting the power provided to the load;
   (b) a base adapted to receive the electromechanical assembly and having a bottom side;
   (c) a cover adapted to cover the electromechanical assembly and mate with the base, the cover having a bottom side;
   (d) a foot formed integral with the base and cover extending from the bottom side, wherein the foot has first and second sides, the first side forms an acute angle with the bottom side, and the second side forms an obtuse angle with the bottom side, and the foot has a notch in the first side adjacent the bottom side.

12. The circuit breaker of claim 11, wherein the base and cover have opposing first and second ends essentially perpendicular to the bottom side and an electrical connector protrudes through the base and cover adjacent the first end and bottom side.

13. The circuit breaker of claim 12, wherein the foot is located closer to the second end than to the first end.

14. A bus cover secured in a panelboard assembly for covering a plurality of exposed bus bars, the panelboard assembly having a plurality of individual circuit breakers, wherein each circuit breaker is electrically connected to a bus bar and the bus cover is disposed between the bus bar and a bottom side of the circuit breaker, the bottom side of the circuit breaker having an extending member, the bus cover having:
   (a) a first opening operatively located to allow electrical connection between a circuit breaker and a bus bar;
   (b) a second opening operatively located to receive the extended member of the circuit breaker and
   (c) a rail adjacent to the second opening for engaging the extended member.

15. The bus cover of claim 14, wherein a spring is integrally formed in the bus cover adjacent the second opening for engaging the foot.

16. The bus cover of claim 15, wherein a ledge is integrally formed in the bus cover adjacent the second opening for stopping the foot from damaging the spring during installation of the circuit breaker into the panelboard assembly.

17. A method of making a panelboard assembly, comprising:
   (a) providing a bus for carrying a source of electric power;
   (b) assembling a circuit breaker for connection to the bus for interrupting the electric power in a circuit path between the source and a load, the circuit breaker having:
      (i) an electromechanical assembly including first and second contacts cooperatively arranged in the circuit path for providing current from the source to the load, wherein at least one of the contacts is movable for interrupting the power provided to the load;
      (ii) a casing for enclosing the electro-mechanical assembly, the casing having a member extending from a side; and
   (c) providing a bus cover for covering the bus, the bus cover having an opening for receiving the extended member; and
   (d) engaging the extended member of the circuit breaker in the bus cover through the opening.

18. The method of claim 17, further comprising connecting the circuit breaker to the bus.

* * * * *